Patented Apr. 27, 1943

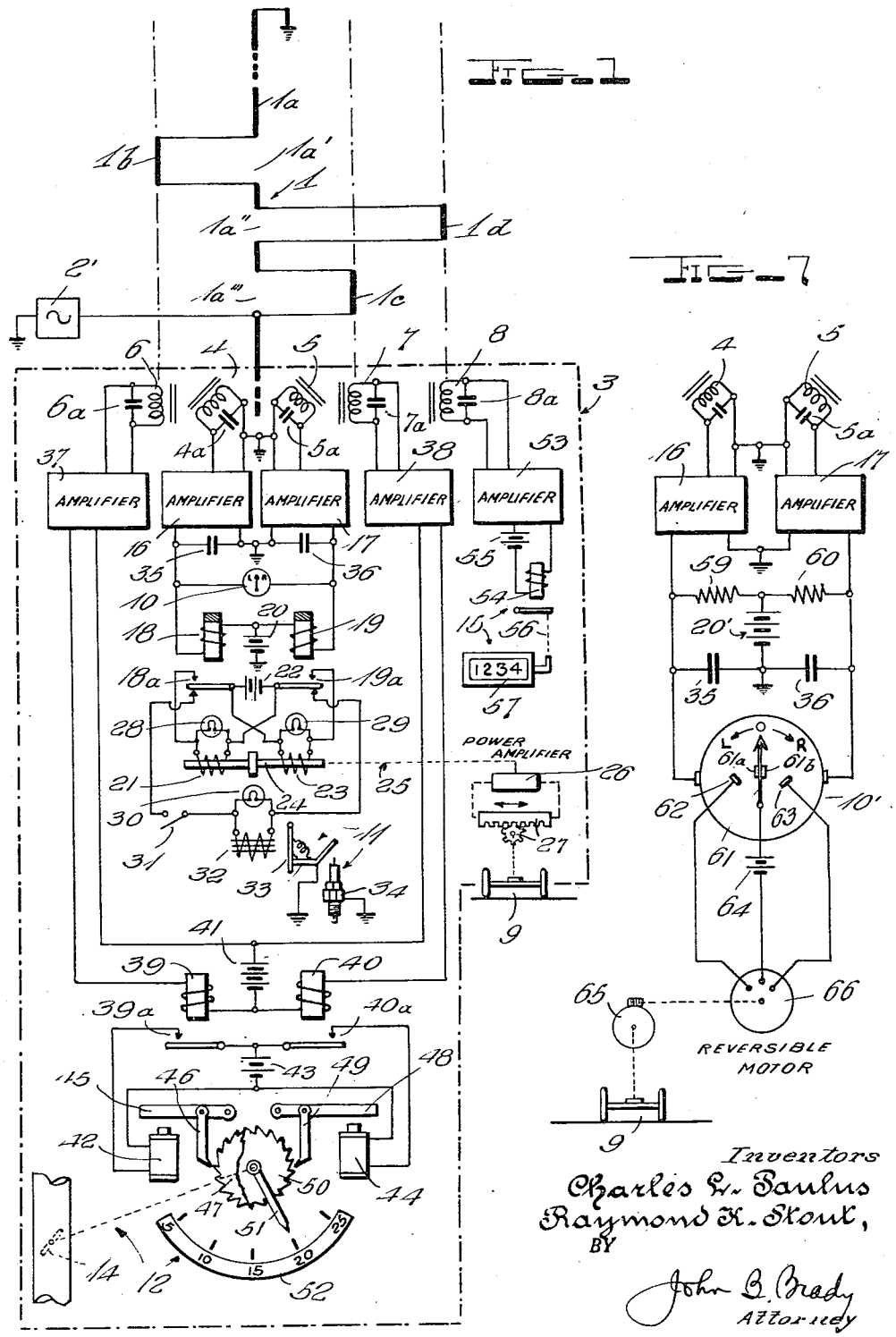

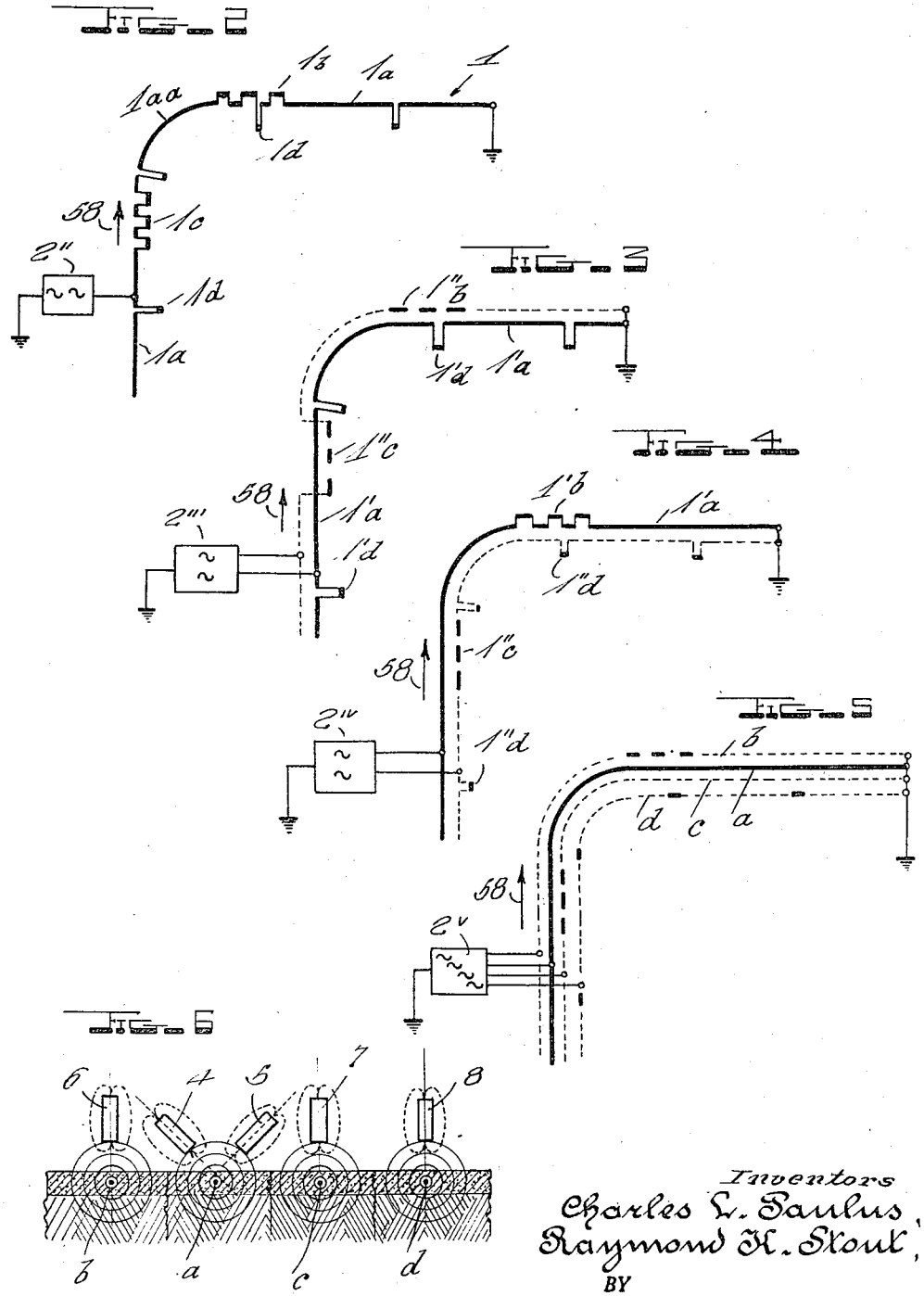

2,317,400

UNITED STATES PATENT OFFICE 2,317,400

AUTOMATIC STEERING AND CONTROL MECHANISM

Charles L. Paulus and Raymond K. Stout, Dayton, Ohio, assignors of one-half to John B. Brady, Washington, D. C.

Application August 19, 1940, Serial No. 353,290

15 Claims. (Cl. 180—79.1)

Our invention relates broadly to a system for controlling the movement of mobile bodies and more particularly to electrically operated signal and automatic steering and control mechanisms for automotive vehicles.

This application is a continuation-in-part of our application Serial No. 331,042, filed April 22, 1940, for Automatic steering mechanism. In this copending application, we have disclosed an arrangement for signalling and controlling the movement of vehicles or other mechanism with respect to a predetermined route defined by a guiding cable, wherein automatic or controlled operation may be effected depending upon the exigencies of the situation. The systems of our inventions are applicable to many and varied purposes for the movement of mobile devices from one place to another along predefined routes, and may be employed independently of human control where an attendant may not be available or under conditions where the attendant may be incapacitated or prevented from exercising normal control of the devices, as, for example, in the operation of farming implements—power operated mowers, rakes, rollers, etc.—or passenger vehicles, trucks, military equipment and the like, especially under war time "blackout" conditions. The guiding cable may be quickly positioned and removed for laying out any desired course or making any desired change of course, as circumstances require; or the cable may be permanently located as, for example, beneath the sod of a lawn over which an automatically controlled mower is periodically directed.

In the operation of the system in any extensive form, curves of various radii may be found and coordination of the speed of the device and the nature of the course is required. For most efficient operation, the speed should be controlled for fast running on substantially straight portions of the course and slower running on the curves.

One of the objects of our present invention is to provide automatic speed control means for regulating the speed of a mobile device for maximum efficiency of operation over a predefined curvilinear course.

Another object of our invention is to provide an automatic speed control arrangement coordinated with a predefined curvilinear course for regulating the speed of a mobile device traversing the course in accordance with the radii of curvature of various portions of the course.

Still another object of our invention is to provide an arrangement of guiding cable for defining a predetermined course for a mobile device adapted to follow the cable, wherein portions of said cable are laterally displaced for operating auxiliary speed control means on the device.

A still further object of our invention is to provide a dual control cable arrangement defining a predetermined course for a mobile device adapted to follow one of the cables, and means including the second cable for operating auxiliary speed control means on the device.

Another object of our invention is to provide a dual control cable arrangement for steering a mobile device on a predetermined course and operating auxiliary speed control means on the device.

Still another object of our invention is to provide a multiple control cable arrangement for providing a plurality of control functions in a mobile device, including steering and speed control functions.

A further object of our invention is to provide an auxiliary control arrangement, cooperative with a guiding cable system for a mobile device adapted to follow the cable, for measuring the distance traveled by the mobile device along the cable.

Other and further objects of our invention reside in the cable arrangements and circuit connections hereinafter described in more detail with reference to the accompanying drawings, in which:

Figure 1 is a schematic diagram of the guiding cable, steering and speed control arrangement of our invention, including the auxiliary distance measuring means; Fig. 2 is a diagram in plan of a curvilinear course defined by the cable shown in Fig. 1, indicating the location of the various off-set portions for operation in accordance with our invention; Figs. 3—5 are diagrams, similar to that of Fig. 2, showing modified cable arrangements for producing like effects in the system of Fig. 1; Fig. 6 is a diagram in elevation showing the theoretical relationship of the different pick-up or antenna coils in respect to the several cable sections; and Fig. 7 is a schematic diagram of a modified form of steering control mechanism which may be employed in the system of Fig. 1.

The system herein described has all of the advantages of that set forth in our copending application Serial No. 331,042 supra, including provision for manual or automatic on-course steering, automatic stopping at the end of the course or when off the course, power operated steering means, signal lamps and course indicator, and, in addition thereto and in cooperation therewith, the further provisions for automatic speed control, distance measurement, and incidental coordinating factors.

In Fig. 1, we have shown a portion of a guiding cable 1 disposed according to our present invention, with a main portion 1a defining the course to be followed, a left side marking projection 1b and a right side marking, projection 1c for supplying impulses for speed control functions, and a further right side marking projection 1d adapted to supply a distance measuring impulse. The cable is energized from a source 2' of low frequency alternating current, preferably not exceeding audible frequencies, and the circuit is completed at ground potential. The mobile device is indicated generally within the broken line 3 and includes the pick-up or antenna coils 4 and 5 in the directional control circuits for coacting with cable portion 1a, coil 6 and coil 7 in the speed control circuits for coacting with cable portions 1b and 1c, respectively, and coil 8 in the distance measurement circuit for coacting with the cable portion 1d. Each of the coils 4—8 is shunted by a condenser 4a—8a, respectively, for tuning the pick-up or antenna circuit to resonance at the frequency of the current in the coacting cable portion; in Fig. 1 this frequency is the same in all portions of the cable 1, but different frequencies may be employed in one and the same cable as indicated in Fig. 2, or in different cables as indicated in Figs. 3–5. The lateral displacement of the cable portions, alone or together with the different frequencies employed, assures the transfer of signal and control energy from each portion of the cable only to the properly coacting coil.

The mobile device also includes steering wheels, indicated diagrammatically at 9, and a visual indicator 10 controllable by the energy induced in coils 4 and 5; in the absence of any such energy, motor cut-off means at 11 is operated to stop the mobile device. Speed control means indicated generally at 12 is controllable by the signals picked up through coils 6 and 7 and operates, for example, the throttle valve 14. Motor cut-off means 11 and throttle valve 14 are suitable subjects for the respective controls where the device is automotive under the action of an internal combustion engine or the like, but any other suitable means may be employed in lieu thereof for like results. A distance meter 15 which is controllable by signals picked up through coil 8, is also provided.

The circuits for controlling the steering mechanism are similar to those disclosed in our earlier application, Serial No. 331,042, supra, and comprise amplifiers 16 and 17 connected with coils 4 and 5, respectively, for controlling the operation of relays 18 and 19 from a common source of power at 20. Relay contact 18a is in circuit with solenoid winding 21 and power source 22, while relay contact 19a is in circuit with solenoid winding 23 and power source 22, for moving armature 24 to the left or to the right depending upon whether relay 18 or relay 19, respectively, is actuated. The movement of armature 24 is transmitted by linkage represented at 25 to a power amplifier 26, which may be hydraulic in character, and thus employed to control the movement of a rack and pinion gear 27 or other suitable means for operating the steering wheels 9. Suitable hydraulic actuating means related to a rack and pinion gear are shown in our copending application Serial No. 331,042, supra, the means 24—27 in Fig. 1 of this application being diagrammatically representative thereof.

Signal lamps 28 and 29 are connected in shunt with solenoid windings 21 and 23, respectively, and serve to indicate the steering operation required—which may be manually effected in the absence of automatic steering means. Relay back contacts 18b and 19b are normally in circuit with power source 22 and a lamp 30 through a switch 31, so that when both relays are deenergized and switch 31 is closed, lamp 30 is lighted, indicating the end of the course, a widely off-course position, or failure of some part of the system. To apply the proper corrective function, solenoid winding 32 is connected in shunt with the lamp 30 and provided with an armature latch assembly 33 adapted to short circuit the ignition system, represented by spark-plug 34 in the motor cut-off means at 11.

The direction indicator at 10 is connected in shunt across both relays 18 and 19 and operates by virtue of the differential of the direct currents therein, which are balanced for on-course condition. By-pass condensers 35 and 36, across the outputs of amplifiers 16 and 17, respectively, prevent the passage of alternating current through the indicator 10 and assure steady indicator operation.

As will be noted, portion 1a of the guiding cable has occasional spacings 1a', 1a'', 1a''', due to the laterally displaced portions 1b, 1c and 1d. In order that both relays 18 and 19 will not open at these spacings, thereby operating the cut-off means 11, the relays may be constructed as a slow release device with a time constant not sufficient, however, to delay materially the control of the steering wheels 9 under conditions of varying current in the relay windings.

The circuits for operating the speed control means 12 comprise amplifier means 37 and 38 connected with pick-up coils 6 and 7, respectively, for controlling the operation of relays 39 and 40 from a common source of power at 41. Relay contact 39a is in circuit with magnet winding 42 and power source 43, while relay contact 40a is in circuit with magnet winding 44 and power source 43. Signal impulses received at coil 6 through portions 1b of the cable result in actuation of relay 39 and energization of magnet winding 42, whereby armature 45 associated therewith is operated to move pawl 46 into engagement with ratchet wheel 47 and advance the setting of throttle 14 to increase the speed of the mobile device 3. Conversely, signal impulses from coil 7 result in operation of armature 48, associated with magnet winding 44, to move the coacting pawl 49 into engagement with ratchet wheel 50 to reduce the setting of throttle 14. Ratchet wheels 47 and 50 may be mounted on the same control shaft, with the pawls normally disengaged therefrom for permitting rotation of the shaft in either direction. An indicator 51 and a suitable scale 52 may be employed to indicate the average speed for a given throttle setting.

The circuits for operating the distance measuring means 15 comprises amplifier 53 connected with coil 8 and operating a counter relay 54 which is energized from power source 55. The counter relay includes a mechanical connection 56 with a register 57 in the distance measuring means 15, and operates upon each signal impulse received through coil 8 from portions 1d of the cable.

In Fig. 2, we have illustrated a curvilinear course laid out with cable 1 in the manner indicated in Fig. 1. The mobile device travels in the direction of the arrow 58 along a substantially straight portion 1a approaching a curved portion 1aa beyond which the course straightens, this being a typical course turn. At a suitable location prior to the curved portion 1aa, laterally displaced marking portions 1c are provided in the cable to supply speed reducing impulses to the speed control means 12 through coil 7, Fig. 1. Three such portions 1c are shown but the number may vary, depending upon the magnitude of the speed reduction required. Beyond the curved portion 1aa, laterally displaced marking portions 1b are provided to supply speed increasing impulses to the speed control means 12 through coil 6, Fig. 1, these being shown as three in number to restore the speed to its previous value, but any desired change in speed may be thus effected. It will be understood that the location of such speed control cable portions 1b, 1c, is not limited to horizontal curves but may be employed at hills and valleys or at any other desirable position. Marking projections 1d are provided substantially equidistantly along the course to supply signal impulses to the counter relay 54 through coil 8. Source 2'' in Fig. 2 is indicated as supplying two frequencies to the cable 1; coils 4 and 5 of the guiding system, for example, may be tuned to respond to one frequency, and coils 6, 7 and 8 of the auxiliaries may be tuned to the other; the second frequency then may be omitted and the auxiliaries prevented from operating, if desired, or the magnitudes of the currents of different frequencies may be maintained at different levels and the sensitivity of the pick-up coils correspondingly adjusted for assuring selective operation of the different control systems.

Different other cable arrangements for effecting control of the mobile device in like manner are shown in Figs. 3–5. In Figs. 3 and 4, two cables are employed and energized at different frequencies. The main cable 1' comprises a guiding portion 1'a and distance measuring marking portions 1'd spaced equally along its length, whereas the second cable 1'' is adapted to supply speed control impulses from marking portions 1''b and 1''c, the intermediate connecting sections of the cable 1'' being shielded or otherwise prevented from effecting operation of the control circuits through coils 6 and 7. In Fig. 4, the arrangement is similar to that of Fig. 3 with the exception that the main cable 1' comprises the guiding portion 1'a and the marking portions 1'b for producing speed increments, while the auxiliary, partially shielded cable 1'' comprises the distance measuring marking portions 1''d and the marking portions 1''c for producing speed decrements. The principal advantage of the dual cable arrangements is improved selectivity due to the separate frequencies of the currents supplied from the source 2''' or 2$^{iv}$.

Fig. 5 illustrates a further possible arrangement wherein separate cables are provided for supplying the several control currents. Cable $a$ is continuously effective to define the course, while cables $b$, $c$ and $d$ are partially shielded or otherwise inoperative, with effective marking portions provided for producing control functions similar in character to those afforded by the cable systems of Figs. 2–4. Source 2$^{v}$ supplies current of different frequency to each of the four cables $a$—$d$.

In Fig. 6 we have illustrated the relationship of the pick-up coils 4—8 to the magnetic fields of the coacting cable portions. Coils 4 and 5 are inclined, with their axes of approximately 90° and intersecting at a point slightly above (or below) the axis of the cable or cable portion $a$. By virtue of this arrangement some energy is induced in both coils 4 and 5 and both relays 18 and 19, Fig. 1, are maintained in energized condition for balanced operation of the armature 24 until a displacement of cable or coils occurs and a differential appears in the relay currents resulting in the operation of one relay only. Coils 6, 7 and 8 are positioned with their axes in alignment with the cables or cable portions $b$, $c$ and $d$, respectively, for maximum signal effect from coaction with the respective cable portions.

Fig. 7 is a schematic diagram of a modified steering control arrangement employing a reversible electric motor 66 to operate the steering wheels 9. Pick-up coils 4 and 5 connect with amplifiers 16 and 17, respectively, as in Fig. 1. The outputs of the amplifiers are balanced by resistors 59 and 60 which connect the amplifiers 16 and 17, respectively, with the common source of power 20', and alternating currents in the outputs are by-passed by condensers 35 and 36 as in Fig. 1. A left-right indicator 10' is connected across resistors 59 and 60 and operable by the differential of the currents therein. The indicator 10' embodies a pointer or like movable member 61 provided with opposite contacts 61a and 61b engageable respectively with fixed contacts 62 and 63 in the indicator structure. The member 61 is connected to a source of motor power 64 and adapted to complete a circuit to motor 66 through either contact 62 or 63, for driving the motor in one direction or the other wherefrom power is transmitted through a worm and wheel gear 65 to adjust the position of steering wheels 9. Contacts 62 and 63 may be adjustable or the circuit otherwise adapted to determine the sensitivity of the steering control.

Various modifications may be effected in the system of our invention in adapting it to particular conditions. The cables or cable portions upon which the control functions are dependent need not be energized by connection with a power source as indicated but may be electrically inert and effective through electrostatic or electromagnetic induction to operate the controls. Furthermore, the cable need not be underground, but may lie on the surface, or be suspended above the surface in a trolley arrangement with the respective coils correspondingly rearranged. In addition, it will be understood that the wheel arrangement shown at 9 is by way of example only, and that the nature of the steering means controlled will be dependent upon the type of mobile device employed.

Besides the various devices hereinbefore mentioned, the system of our invention may be employed in the establishment and maintenance of municipal transit systems where fleets of buses are operated on schedules, to relieve the drivers of fatigue from steering and at the same time enforce speed limitations in restricted areas while permitting the usual transit services. Such a transit system would be less expensive in construction and maintenance than comparable rail systems, more easily subjected to route changes and more reliable in service.

Thus, while we have disclosed our invention in certain preferred embodiments, we desire it understood that further modifications may be made therein and that no limitations upon our invention are intended thereby but only such as are imposed by the scope of the appended claims.

What we claim as new and desire to secure by Letters Patent of the United States is as follows:

1. An electrical steering and control system for mobile devices comprising a conductive element disposed to define a substantially continuous prearranged course and having auxiliary conductive elements of limited extent located at selected positions laterally in association with said prearranged course, inductive means carried by the mobile device and cooperatively related to the conductive element defining said substantially continuous prearranged course, means controlled by cooperation of said conductive element and said inductive means for directing the movement of the mobile device along said course, auxiliary inductive means carried by the mobile device and cooperatively related to said auxiliary conductive elements of limited extent, and means controlled by cooperation of said auxiliary conductive elements and said auxiliary inductive means for controlling the operation of the mobile device in movement along said prearranged course.

2. An automatic electrical steering and control system for automotive devices comprising a conductive element disposed to define a substantially continuous prearranged course and having auxiliary conductive elements of limited extent located at selected positions laterally in association with said prearranged course for control purposes, inductive means carried by the automotive device and cooperatively related to the conductive element defining said substantially continuous prearranged course, automatic steering means controlled by cooperation of said conductive element and said inductive means for automatically directing the movement of the automotive device along said course, auxiliary inductive means carried by the automotive device and cooperatively related to said auxiliary conductive elements of limited extent, and automatic regulating means controlled by cooperation of said auxiliary conductive elements and said auxiliary inductive means for automatically effecting control of the operation of the automotive device in movement along said prearranged course.

3. In combination with the steering mechanism and prime mover of an automotive device, powered control means for said steering mechanism, and means for controlling said prime mover; a guiding element disposed to define a substantially continuous prearranged course for said automotive device and having auxiliary marking elements of limited extent located at selected positions laterally in association with said prearranged course, means carried by the automotive device in cooperative relation to said guiding element and connected with the powered control means for said steering mechanism for automatically directing the movement of the automotive device along said course, auxiliary means carried by the automotive device in cooperative relation to said auxiliary marking elements, and means connected with said prime mover control means and actuated by said auxiliary means for automatically controlling the operation of the automotive device in movement along said prearranged course.

4. In combination with the steering control means and variable speed control means of an automotive device, a guiding element disposed to define a substantially continuous prearranged course for the automotive device and having auxiliary marking elements of limited extent located at selected positions laterally in association with said prearranged course, differential course following means carried by the automotive device in cooperative relation to said guiding element and connected with said steering control means for automatically directing the movement of the automotive device along said course, auxiliary means carried by the automotive device in cooperative relation to said marking elements, and means connected with said speed control means and actuated by said auxiliary means for automatically controlling the speed of the automotive device in movement along said prearranged course.

5. The combination set forth in claim 4 wherein said guiding element is an electrically energized cable and wherein said steering control means includes a rack and gear mechanism, a solenoid energized in accordance with the operation of said differential means, and means connected between said control device and said rack for moving said rack in accordance with the operation of said differential means and the corresponding movement of said solenoid.

6. The combination set forth in claim 4 wherein said steering control means includes a reversible motor, differential switching means connected with said differential course following means, and a source of power connected with said motor through said switching means for driving said motor in accordance with the operation of said differential course following means.

7. The combination set forth in claim 4 wherein said speed control means includes a control shaft rotatable in opposite directions for increasing and decreasing the speed, and pawl and ratchet means controlled by said auxiliary means for stepping the rotation of the shaft in either direction in accordance with the location and frequency of said auxiliary marking elements and the operation of said auxiliary means in respect to said marking elements.

8. The combination set forth in claim 4 and including additional auxiliary marking elements equidistantly located along said course, and other auxiliary means carried by the automotive device in cooperative relation to said additional auxiliary marking elements for registering the number of said additional marking elements encountered by the automotive device in movement along said prearranged course, for distance measurement.

9. An electrical steering and control system for an automotive device adapted for automatic operation over a prearranged course, comprising, in combination, a guiding element formed by an electrically conducting path disposed to define a substantially continuous prearranged course for the automotive device, a plurality of auxiliary electrically conducting marking elements of limited extent located at selected positions along said course in association laterally with said guiding element to afford auxiliary functions in the operation of the automotive device in movement along said prearranged course, separate responsive means carried by the automotive device and cooperative with the respective guiding and marking elements, and separate means controlled respectively by the separate responsive means for effecting the automatic operation of said device in accordance with the disposition and location of said guiding and marking elements.

10. The combination set forth in claim 9 wherein said guiding and marking elements are provided by a single electrically energized cable, the main portion of which constitutes said guiding element and laterally displaced portions of which constitute said auxiliary marking elements of limited extent.

11. The combination set forth in claim 9 wherein said guiding and marking elements are provided by a plurality of electrically energized cables, one of said cables having a main portion constituting said guiding element and laterally displaced portions of limited extent constituting auxiliary marking elements of one function, and another of said cables having active portions of limited extent constituting auxiliary marking elements of at least one other function.

12. The combination set forth in claim 9 wherein said guiding and marking elements are provided in separate electrically energized cables, one of said cables having a substantially continuous active portion for defining said substantially continuous prearranged course, and others of said cables having active portions of limited extent disposed laterally with respect to said course and constituting said auxiliary marking elements.

13. The combination set forth in claim 9 including means for energizing said guiding and marking elements by alternating current the frequency of which differs for different functions in the movement and operation of said automotive device, and the separate responsive means cooperative with the respective elements are tuned to resonance at the frequencies of the respective functions.

14. In a transit system, in combination, a vehicle operable over a predetermined route on schedule, and means for confining the movement of said vehicle to such route and controlling the operation of said vehicle along such route including an electrically conducting guiding element disposed to define the predetermined route and a plurality of auxiliary marking elements of limited extent located at selected positions along said route in association with said guiding element; said vehicle having a controllable steering mechanism and means cooperative with said guiding element for controlling said steering mechanism, and variable speed electrically operated control means and means cooperative with said auxiliary marking elements for operating said variable speed electrically operated control means, for maintaining the scheduled operation of said vehicle.

15. In a transit system, the combination set for in claim 14 wherein said vehicle is provided with electrically operated stopping means, and with electrically operated control means effective upon the movement of said vehicle off said route for actuating said stopping means.

CHARLES L. PAULUS.
RAYMOND K. STOUT.